(12) United States Patent
Kalayjian

(10) Patent No.: US 7,549,008 B2
(45) Date of Patent: Jun. 16, 2009

(54) INTERFACE ADAPTER FOR A PORTABLE MEDIA PLAYER DEVICE

(75) Inventor: Nicholas Kalayjian, San Carlos, CA (US)

(73) Assignee: Universal Electronics, Inc., Cypress, CA (US)

( * ) Notice: Subject to any disclaimer, the term of this patent is extended or adjusted under 35 U.S.C. 154(b) by 22 days.

(21) Appl. No.: 11/495,192

(22) Filed: Jul. 28, 2006

(65) Prior Publication Data

US 2007/0073958 A1   Mar. 29, 2007

Related U.S. Application Data

(60) Provisional application No. 60/706,142, filed on Aug. 5, 2005.

(51) Int. Cl.
*G06F 13/20* (2006.01)

(52) U.S. Cl. .............. 710/313; 710/305; 710/306; 710/100

(58) Field of Classification Search .............. 710/100, 710/313, 305–306
See application file for complete search history.

(56) References Cited

U.S. PATENT DOCUMENTS

| | | | |
|---|---|---|---|
| 6,801,968 B2 * | 10/2004 | Hunter | 710/65 |
| 2003/0041183 A1 * | 2/2003 | LaPierre et al. | 710/1 |
| 2003/0144918 A1 * | 7/2003 | Novelli et al. | 705/26 |
| 2006/0011368 A1 * | 1/2006 | Maruyama et al. | 174/33 |
| 2006/0288112 A1 * | 12/2006 | Soelberg | 709/231 |

* cited by examiner

*Primary Examiner*—Clifford H Knoll
*Assistant Examiner*—Kim T Huynh
(74) *Attorney, Agent, or Firm*—Greenberg Traurig LLP

(57) ABSTRACT

A "smart cable" that connects one or more peripheral devices to a digital media player having multiple, different types of input and/or output connections.

7 Claims, 3 Drawing Sheets

INTERFACE ADAPTER FOR A PORTABLE MEDIA PLAYER DEVICE

BACKGROUND

In the art, interface adapters are known. For example, U.S. Pat. No. 4,124,889 illustrates and describes a distributed input/output system for controlling numerous peripheral devices and for transferring data signals and control signals between the peripheral devices and a general purpose digital computer. The control system described includes a multiplexer which can accommodate as many as eight input/output devices under the control of separate programmable microcoded peripheral-unit controllers. Each controller is adapted to be located at or on an individual peripheral device and each is connected to the multiplexer by an identical ribbon cable that is employed to carry both signals and power. Each controller employs a substantially identical microengine, that is, a microcoded processor. The peripheral-unit controllers may be configured somewhat differently depending upon whether the peripheral device utilizes data signals in parallel or in series. Data may be transferred directly between a computer memory unit and the peripheral devices without requiring the use of any computer working registers and without requiring subroutines to preserve an ongoing main program. Each peripheral-device controller can issue interrupt signals which are processed by the computer on a priority basis when they occur simultaneously. Some microengines employ two sets of programmed microcodes and each set is selectable by a switch, such as a wire jumper, for controlling either of two different kinds of devices.

Also known in the art are a number of audio/serial interface cables for connecting a digital media player, such as an iPod® to another device. Most of the cables are used in connection with automotive applications. For example, Mercedes, BMW, Audi, VW and Porsche all sell aftermarket cables to allow an iPod® to be integrated into their cars using an analog/serial cable. Dension and Monster Cable also sell aftermarket kits for integration with many vehicle head units. Clarion and Kenwood both sell aftermarket car audio systems that include analog/serial interface to an iPod®. None of these solutions, however, are USB or digital and thus they are all single mode and cannot be used to transfer digital content to the iPod®.

Accordingly, a need exists for an improved cable adaptor, for example, one which can be used to both transfer data to or from an iPod®, in file form, as well as to control analog audio playback over a serial port.

SUMMARY

The following describes a "smart cable" that can connect one or more peripheral devices to a digital media player having multiple, different types of input and/or output connections. By way of example, in the case of the iPod® there are three connection options, USB device, serial port, and analog audio and the iPod® can operate in two modes, either as a USB mass storage device, or as a serially controlled analog audio source.

DETAILED DESCRIPTION

The iPod®, and potentially other media players, have usage limitations that are driven by the Digital Rights Management (DRM) licenses of online music services or content providers. In the case of iPod®, Apple does not allow the music transferred to an iPod® to be played in a digital form on any device other than the specific iPod® it was transferred to from iTunes®. To allow iPods to operate with other systems such as cars or home stereos, Apple defines a serial protocol for controlling the analog audio playback from the device.

In some cases such as data synchronization from non-iTunes® servers, a system such as a car multimedia controller might want to connect to the iPod® over a digital USB connection.

The invention thus provides a cable that uses the USB protocol to either connect the host multimedia system to the iPod® over an analog and serial interface, or over a digital interface, depending on the specific use required. USB is the common interface, and analog and serial signals are converted to USB to allow a single connection to the host multimedia system.

To this end, FIG. 1 is a design that uses standard, discrete components. The design starts with a USB hub that converts a single host port on the multimedia playback system into multiple ports. In digital USB transfer mode, the host directs the USB hub to enable the USB connection directly to the iPod® and disable the connection to the USB audio and USB serial converters. Data can then be transferred in a file based USB mass storage model between the iPod® and the host. In analog/serial mode, the host commands the hub to disable the direct USB connection to the iPod® and instead enable the USB serial and USB audio converters. The iPod® can then be controlled over the serial interface and analog audio is digitized by the analog to digital converter "ADC" and sent to the host.

Figure 1:
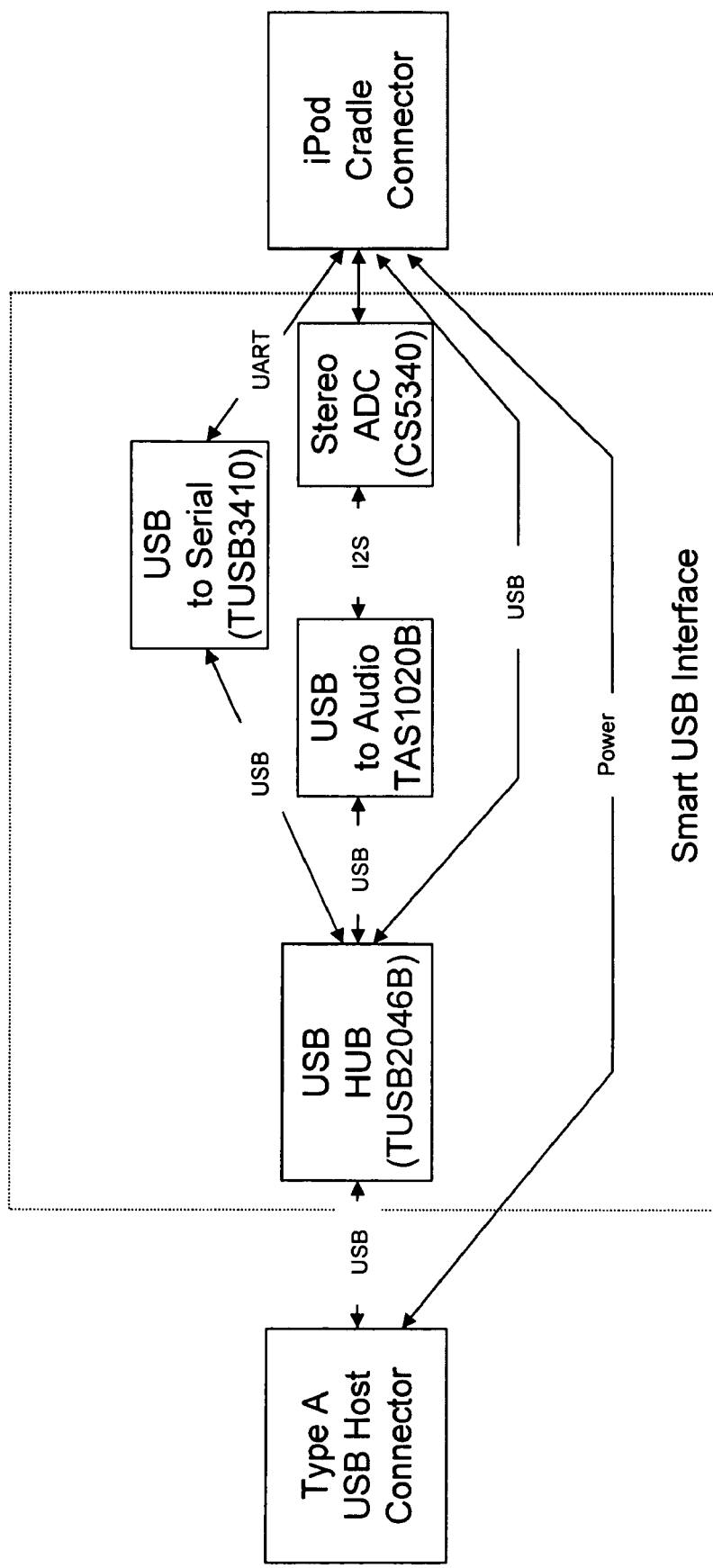
Figure 2:
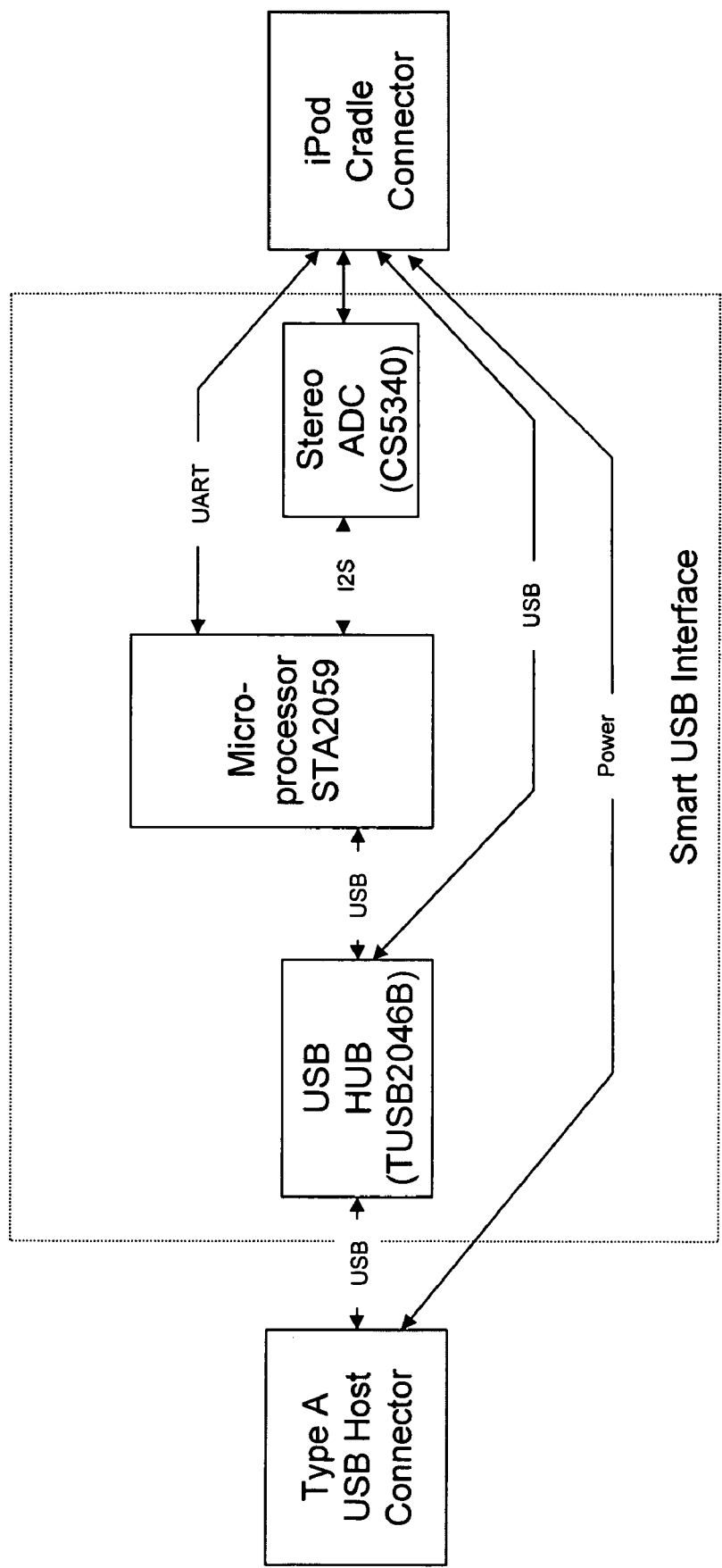
FIG. 2 is a refinement of the embodiment illustrated in FIG. 1 and uses a microprocessor to combine the functions of the USB audio and serial converters. The host either enables the direct USB connection to the iPod®, or it enables the microprocessor USB port to enable the audio and serial interface.
Figure 3:
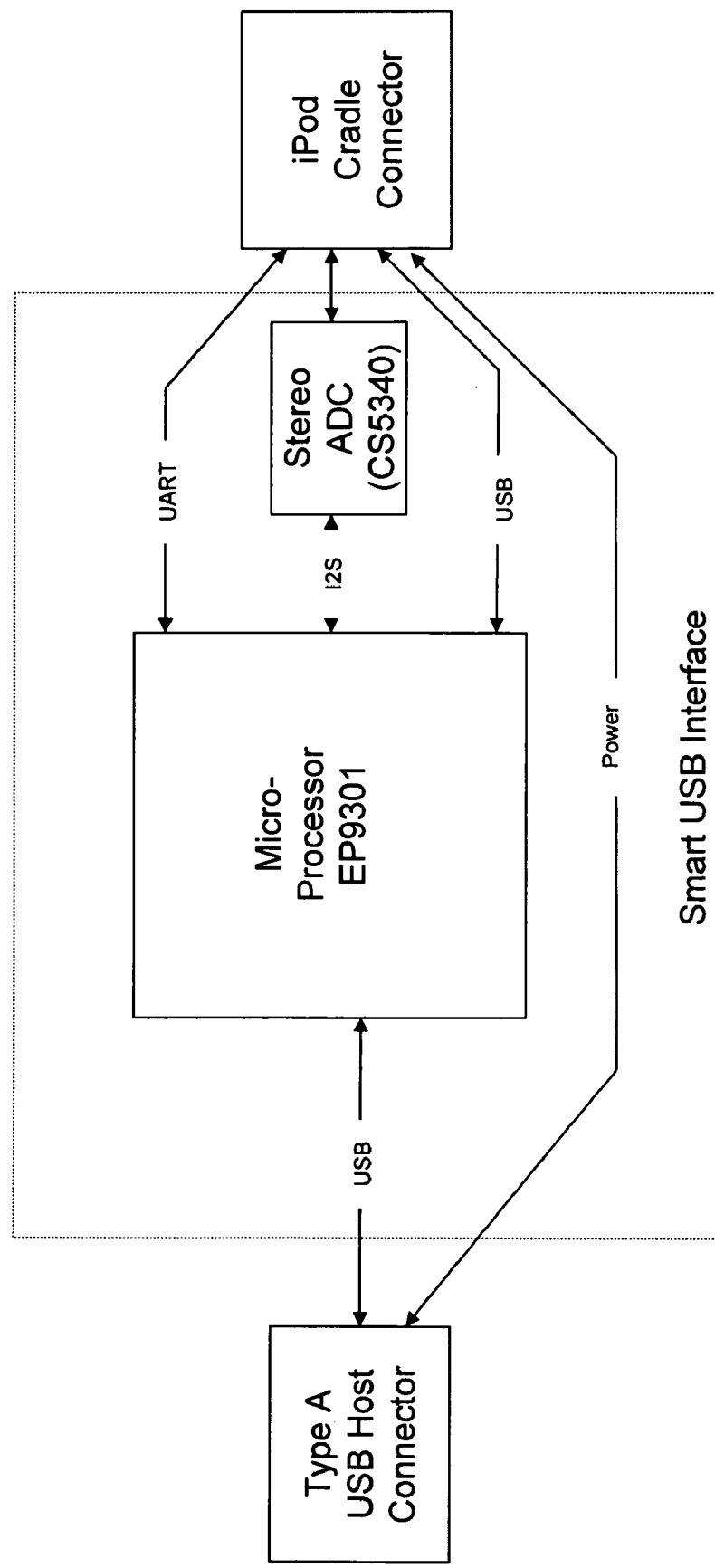
FIG. 3 is a still further refinement that uses a microprocessor to combine the functions of the USB hub, USB audio converter, and the USB serial converter. The host sends commands to the microprocessor to enable either the USB or the analog audio/serial interface.

The design shown in FIG. 1 could be assembled from off-the-shelf parts by any person familiar with the iPod® protocol and USB protocols. The designs of FIGS. 2 and 3 are more refined and, while requiring more engineering and firmware, are well within the capabilities of those skilled in the art. The designs of FIGS. 2 and 3 will additionally result in a reduction in product cost.

Although the Apple iPod® was used by way of example in the exemplary descriptions, it will be understood that the principles described herein are broadly applicable to portable media player devices in general. For example, the different types of ports of the portable media device may be a USB port and an analog port; a serial port and an analog port; etc. without limitation.

What is claimed is:

1. A device for connecting a media playback device having a first USB port, an analog port, and a serial port with a host device having a second USB port, comprising:

a USB interface adapter having a first connector and a second connector for respectively placing the first USB port, the analog port, and the serial port of the media playback device into communication with the second USB port of the host device wherein the USB interface adapter functions in a digital transfer mode enabled via a communication received from the host device to facilitate communications between the host device and the media playback device via the second USB port of the host device and the first USB port of the media playback device to allow data to be transferred in a file between the digital media playback device and the host device and wherein the USB interface adapter functions in an analog/serial mode enabled via a communication received from the host device to facilitate communications between the host device and the media playback device via the second USB port of the host device and both of the analog port and serial port of the media playback device wherein the USB interface adapter further functions in the analog/serial mode to convert control signals received from the host device via the second USB port of the host device to serial communications which are provide to the media playback device via the serial port of the media playback device to allow for control of the media playback device and to convert analog signals received from the media playback device via the analog port of the media playback device to digital signals which are provided to the host device via the second USB port of the host device to allow for playback of digital media stored on the media playback device by the host device.

2. The device as recited in claim 1, wherein the media playback device comprises an iPod®.

3. The device as recited in claim 1, wherein the USB interface adapter comprises a USB hub in communication with the second USB port of the host device and the first USB port of the media playback device, a USB/serial converter in communication with the serial port of the media playback device and the USB hub, a USB/audio converter in communication with the USB hub, and a stereo ADC in communication with the USB/audio converter and the analog port of the media playback device.

4. The device as recited in claim 1, wherein the USB interface adapter comprises a USB hub in communication with the second USB port of the host device and the first USB port of the media playback device, a microprocessor in communication with the USB hub and the serial port of the media playback device, and a stereo ADC in communication with the microprocessor and the analog port of the media playback device.

5. The device as recited in claim 1, wherein the USB interface adapter comprises a microprocessor in communication with the second USB port of the host device, the first USB port of the media playback device, and the serial port of the media playback device and a stereo ADC in communication with the microprocessor and the analog port of the media playback device.

6. A device for connecting a media playback device having a first USB port and an analog port with a host device having a second USB port, comprising:

a USB interface adapter having a first connector and a second connector for respectively placing the first USB port of the media playback device and the analog port of the media playback device into communication with the second USB port of the host device wherein the USB interface adapter functions in a first mode enabled via a communication received from the host device to facilitate communications between the host device and the media playback device via the second USB port of the host device and the first USB port of the media playback device and wherein the USB interface adapter functions in a second mode enabled via a communication received from the host device to facilitate communications between the host device and the media playback device via the second USB port of the host device and the analog port of the media playback device wherein the USB interface adapter further functions in the second mode to convert analog signals received from the media playback device via the analog port of the media playback device to digital signals which are provided to the host device via the second USB port of the host device to allow for playback of digital media stored on the media playback device by the host device.

7. A device for connecting a media playback device having an analog port and a serial port with a host device having a USB port, comprising:

a USB interface adapter having a first connector and a second connector for respectively placing the analog port of the media playback device and the serial port of the media playback device into communication with the USB port of the host device wherein the USB interface adapter functions in a mode enabled via a communication received from the host device to facilitate communications between the host device and the media playback device via the USB port of the host device and both of the analog port and serial port of the media playback device wherein the USB interface adapter further functions in the mode to convert control signals received from the host device via the USB port of the host device to serial communications which are provide to the media playback device via the serial port of the media playback device to allow for control of the media playback device and to convert analog signals received from the media playback device via the analog port of the media playback device to digital signals which are provided to the host device via the USB port of the host device to allow for playback of digital media stored on the media playback device by the host device.

\* \* \* \* \*